United States Patent Office 3,400,282
Patented Sept. 3, 1968

3,400,282
ROTARY ELECTROSTATIC ELECTRICAL
APPARATUS
Noel J. Felici, Grenoble, France, assignor to Centre National de la Recherche Scientifique, Paris, France, an agency of the French Government
Filed Jan. 18, 1966, Ser. No. 521,343
Claims priority, application France, Jan. 22, 1965,
4,759, 4,760
20 Claims. (Cl. 310—6)

This invention relates to electrical apparatus of the type having a pair of relatively rotatable members, and more particularly to apparatus in which the members are spaced apart to define a separating space therebetween which is filled with a dielectric medium.

The present invention, while of general application, is well suited for use as an electrostatic generator or motor in which one of the relatively rotatable members comprises a rotating charge carrier. In recent years, there have been developed electrostatic generators, for example, which are capable of delivering many kilowatts of power at voltages of hundreds of kilovolts while being of extremely compact size. Generators of this character are now tending to replace the more conventional electromagnetic generators, almost exclusively used in the past, in an ever-increasing number of engineering applications.

In the operation of such electrostatic generators, as with other apparatus of the type in which an electrical field is present across a dielectric medium, the specific power rating of the machine, that is, the power for a machine of unit size, is proportional to the product of the dielectric constant of the medium used and the square of the field strength applied across the medium. Mathematically, specific power=$K \times \epsilon E^2$, where $\epsilon$ is the dielectric constant and E the applied field strength.

Since the maximum permissible field strength E is dependent upon the dielectric strength or rigidity of the medium, it is seen in fine that the maximum power rating of a given-size machine is limited by the dielectric constant and the dielectric strength (or breakdown voltage). It is therefore evident that the choice of the dielectric medium is an important factor in the development of electrostatic machines of increased specific power ratings and efficiency.

In the design of many types of rotary electrical apparatus, consideration must also be given to two further properties of the dielectric medium. The medium must possess comparatively high resistivity, and it must be fluid, i.e., a gas or a liquid as opposed to a solid, in order to permit free relative motion between the relatively rotatable members of the apparatus. Among the advantages of liquid fluids over gases as the dielectric medium, the liquids are capable of displaying very much higher dielectric constants as well as greater dielectric strength. Thus, the dielectric constant for gas approximates unity, whereas many pure polar liquids exhibit dielectric constants in the range from 20 to 100. Heretofore, however, attempts to utilize liquid fluids as the dielectric medium in rotary electrical apparatus or machinery have proved deficient in several respects. Of special moment has been the difficulty of maintaining the liquid in a state of sufficiently high purity to enable it to retain the necessary high resistive and dielectric characteristics for any appreciable length of time. Minute proportions of contaminants in the liquid are sufficient to cause a sharp drop in these characteristics and hence substantially eliminate the advantages expected from its use. Such contamination occurs in a comparatively short time due to attack and dissolution of the container wall surfaces promoted by the intense electric field, and from other sources.

Because of these difficulties, the use of liquid dielectric media for the most part has been discarded in the commercial production of electrostatic machinery in favor of gaseous fluids.

As a result, the specific power ratings achievable have been severely limited. Moreover, when using gaseous dielectrics in several types of machines, the gas must be pressurized since otherwise its dielectric strength or rigidity (breakdown voltage) would be unacceptably low. This is inconvenient in many applications because, inter alia, it greatly complicates the disassembly of the machine even for the performance of routine maintenance operations.

One general object of this invention is to provide new and improved electrical apparatus of the type having a pair of relatively rotatable members with a dielectric medium therebetween.

More specifically, it is an object of the invention to provide such electrical apparatus in which the dielectric medium is maintained in a state of sufficiently high purity to enable it to retain high resistive and dielectric characteristics for an appreciable period of time.

Another object of the invention is to provide improved, practically operative electrostatic apparatus having a rotating charge carrier.

A further object of the invention is to provide an electrostatic generator of either the insulating or conductive carrier type having a liquid dielectric medium.

Still another object of the invention is to provide electrical apparatus of the character indicated which is economical to manufacture and thoroughly reliable in operation.

There has been developed a system for maintaining a polar liquid in a purified condition which exhibits numerous advantages. One particularly effective purification system of this type is disclosed in copending U.S. application Ser. No. 387,286 filed Aug. 4, 1964, by Noel Felici. As more fully explained therein, when a polar liquid is placed in the central one of three compartments separated by suitable permeability-selective membranes and is exposed to an electric field across electrodes placed in the side compartments, the liquid is continually purified by a process akin to but distinct from electrodialysis and is continually maintained in a state of extremely high resistivity and dielectric properties.

In accordance with the present invention, there is provided unique rotary electrical apparatus in which the dielectric medium between two relatively rotatable members is exposed to an electrical field in a manner such that the medium is maintained in a highly purified condition. In certain important embodiments of the invention, one or more membranes of the type disclosed in the above application Ser. No. 387,286 are employed to provide a separate compartment or cavity adjacent the dielectric medium. Contaminant ions within the medium are driven by the field through the membrane and into the cavity, with the result that the medium retains a high degree of purity with extremely good resistivity and dielectric characteristics.

The present invention, as well as further objects and advantages thereof, will become more fully apparent from the following description of certain preferred embodiments, when read with reference to the accompanying drawings, in which.

Figure 2:
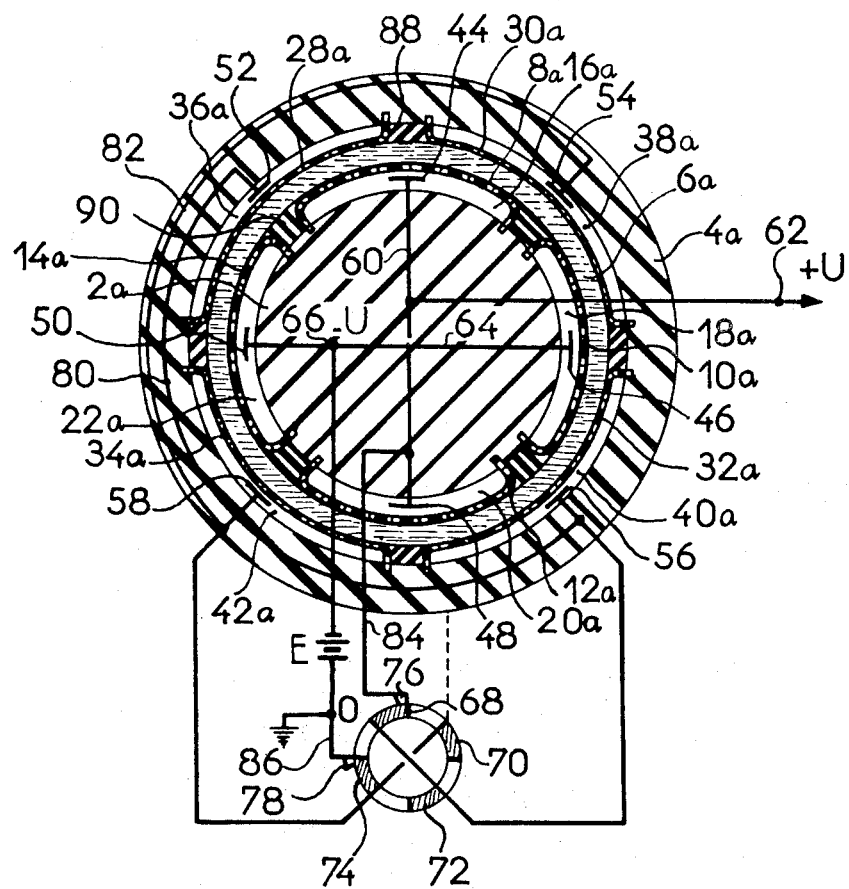
FIGURE 2 is a partially schematic sectional view of a four-pole conductive charge-carrier generator in accordance with another illustrative embodiment of the invention, the generator having an inner stator and an outer rotor.
Figure 4:
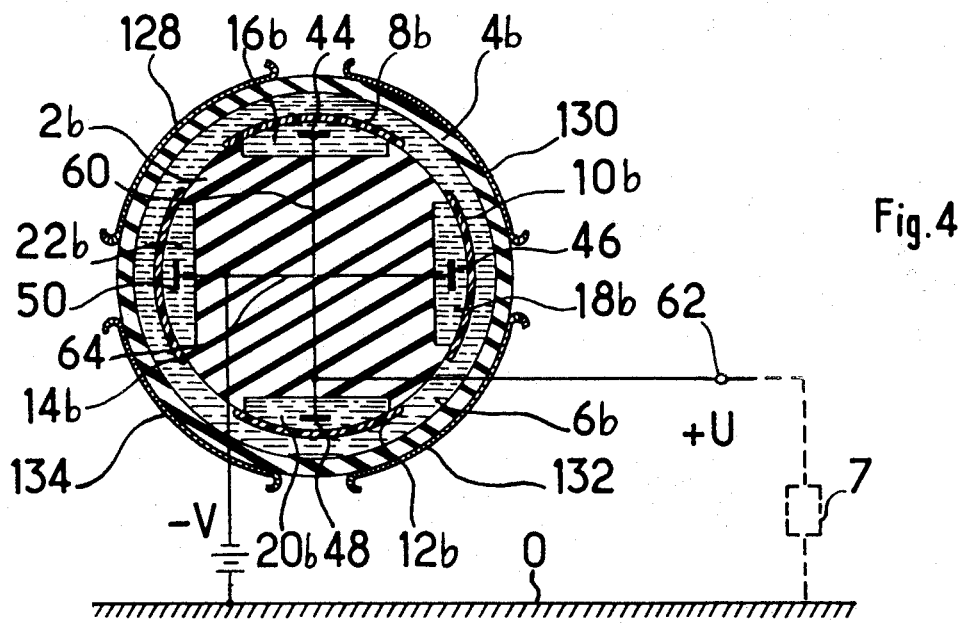
Figure 5:
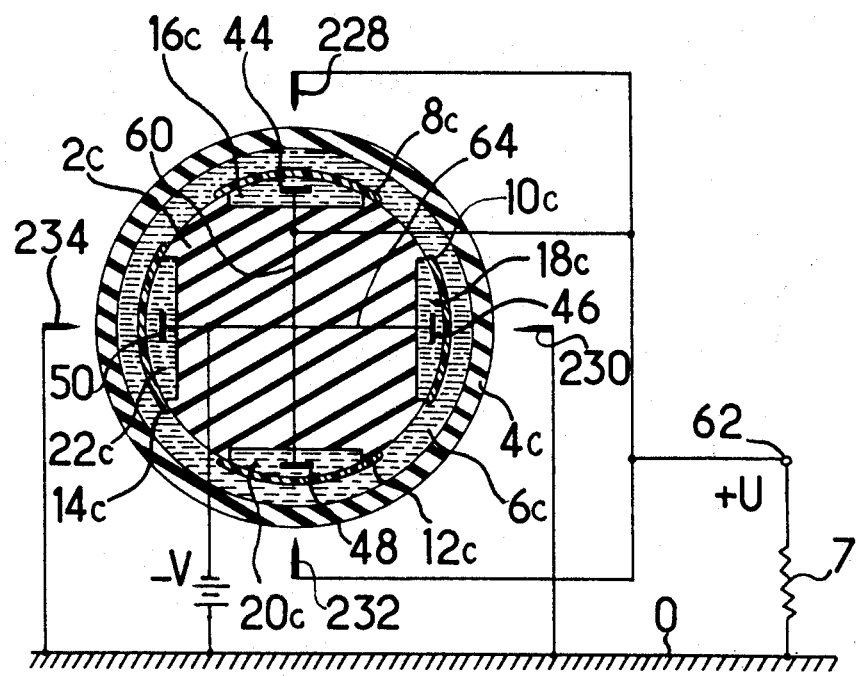

FIGURE 4 is a partially schematic sectional view similar to FIGURE 2 but showing a four-pole conductive charge-carrier generator in accordance with a third illustrative embodiment of the invention; and FIGURE 5 is a partially schematic sectional view similar to FIGURE 4 but showing a four-pole electrostatic generator of the insulating charge-carrier type in accordance with a fourth illustrative embodiment of the invention.

Figure 1:
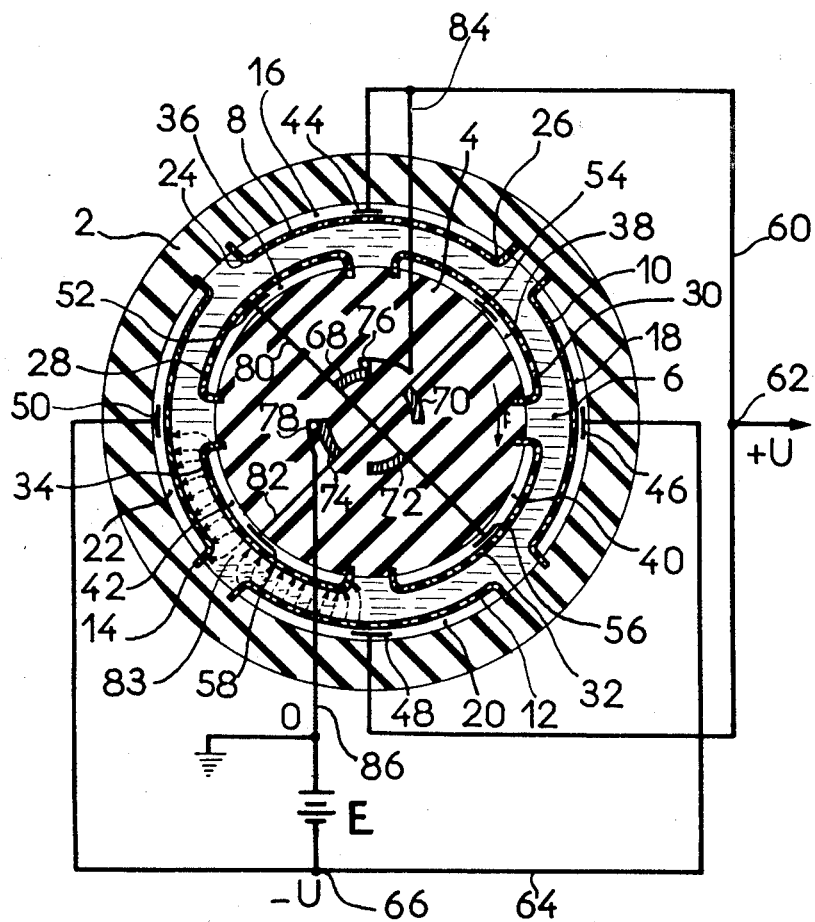
FIGURE 1 is a partially schematic sectional view of a four-pole electrostatic generator in accordance with one illustrative embodiment of the invention, the generator being of the conductive charge-carrier type and having an outer stator and an inner rotor.

Referring to FIGURE 1, there is shown a four-pole electrostatic generator of the Toepler type, that is, with conductive charge-carriers, which is of improved construction in accordance with one illustrative embodiment of this invention. In this embodiment, the generator is of the type having an inner rotor and outer stator. The generator accordingly includes an annular cylindrical stator 2 and a generally cylindrical rotor 4 mounted coaxially within the stator for rotation therein in the clockwise direction as indicated by arrow $f$. Any suitable electric motor or other driving means (not shown) may be provided for driving the rotor in rotation. An annular space 6 is defined between the adjacent surfaces of the stator 2 and the rotor 4.

Secured to the inner cylindrical surface of the annular stator 2 are four semi-permeable or permeability-selective membranes 8, 10, 12 and 14. Each membrane or diaphragm includes a main wall portion in the form of a cylindrical segment which is coaxial with the stator and is somewhat smaller in arcuate extent than one fourth of a circumference. These wall portions are spaced radially from the inner surface of the stator so as to define with that surface four cavities or chambers 16, 18, 20 and 22, respectively. The main wall portions of the membranes are extended on both sides by short side wall portions such as 24 and 26 which are disposed in generally radial planes and are connected with the main wall portions by rounded corner sections. The radial portions 24 and 26 have their free edges inserted into slots formed in the inner cylindrical surface of the stator along generatrices thereof, and these edges may be further secured in position with a suitable insulating adhesive such as an epoxy resin. At their axial ends, the chambers 16, 18, 20 and 22 are bounded by suitable end walls which are secured to the stator in a generally similar manner as the side walls, so as to tightly seal the chambers.

Mounted on the outer cylindrical surface of the rotor 4 are four semi-permeable diaphragms or permeability-selective membranes 28, 30, 32 and 34. The membranes 28, 30, 32 and 34 are fabricated from a material similar to that of the stator membranes 8, 10, 12 and 14 and are each provided with a main wall portion in the form of a cylindrical segment which describes somewhat less than one-fourth of a circumference. These main wall portions are radially spaced from the rotor surface to form four cavities or chambers 36, 38, 40 and 42 therewith. Each membrane is further provided with side wall portions extending substantially radially and having their free edges inserted into and adhesively bonded in generatricial slots formed in the rotor surface. The rotor chambers are axially bounded by end walls, such that each chamber is tightly sealed.

Respectively positioned within the stator chambers 16, 18, 20 and 22 are four electrodes 44, 46, 48 and 50. Similarly, four electrodes 52, 54, 56 and 58 are respectively positioned within the rotor chambers 36, 38, 40 and 42. The electrodes may be made from any suitable corrosion-resistant and electrically conductive material.

The diametrically opposed stator electrodes 44 and 48 are interconnected by a conductor 60 and are connected in parallel to a high-voltage generator output terminal 62.

The output terminal 62 is of positive polarity and illustratively develops a voltage of 50 kv. The other pair of diametrically opposed stator electrodes 46 and 50 are interconnected by a conductor 64 and are connected in parallel to a terminal 66 which comprises the negative terminal of a D.C. auxiliary excitation source E, having its other terminal O grounded. The output voltage of the source E also may be 50 kv. in the illustrative embodiment of FIGURE 1.

The generator includes a commution switch arrangement having four collector segments 68, 70, 72 and 74. These segments each subtend forty-five degrees in arcuate extent and are disposed on a common circumference with all four segments being bodily rotatable with the rotor 4. The diametrically opposed pair of commutator segments 68 and 72 are electrically interconnected with each other and with the diametrically opposed rotor electrodes 52 and 56 by a conductor 80. In a similar manner, the other diametrically opposed pair of commutator segments 70 and 74 are interconnected with each other and with the remaining rotor electrodes 54 and 58 by a conductor 82.

Frictionally engageable with the four commutator segments 68, 70, 72 and 74 are two stationary brushes 76 and 78 which are supported in ninety degree displaced relationship around the stator. The brush 76 is connected through a conductor 84 and the conductor 60 to the generator output terminal 62, while the brush 78 is connected through a conductor 86 to the grounded terminal O.

The annular space 6 and the eight chambers including the four stator chambers 16–22 and the four rotor chambers 36–42 are filled, by way of pluggable filling orifices (not shown), with a dielectric fluid. This fluid preferably comprises a suitable polar liquid and advantageously is the same, initially, in the space 6 and in the chambers. Such liquid may, for example, be nitrobenzene of commercial grade.

The apparatus operates as follows:

Every point within the annular body of liquid in the space 6 is subjected, during portions of each revolution of the rotor 4, to an intense electric field. This field is generated, as will become more fully apparent hereinafter, between one of the four stator membranes 8–14, continually at potential $+U$ or $-U$, and one of the four rotor membranes 28–34, at a variable potential between O and $+U$. Under the effect of the field, any contaminant ions present in the liquid within the space 6 migrate through selected ones of the ion-permeable membranes 8–14 and 28–34 into the nearest stator chamber 16–22 or the nearest rotor chamber 36–42, depending on the sign of the ion, and remain trapped in the chamber.

Within a short time, e.g., some seconds, after the machine has been placed in operation, the liquid in the annular space 6 assumes a state of extremely high purity, and its resistivity takes a correspondingly high value, illustratively of the order of $10^{10}$ to $10^{12}$ ohms centimeter, whereupon the liquid acts as a high-grade insulator. Concurrently, the liquid in the stator and rotor chambers 16–22 and 36–42 remains, or becomes, a good conductor. At this time and thereafter, the machine can be considered as being equivalent, from the operational standpoint, to a conventional electrostatic generator of the conductive-conveyor class (Toepler machine). Thus, the membranes 8–14 serve the function of the so-called inductor electrodes (consisting of metallic segments in the conventional Toepler generator), and the membranes 28–34 act as the so-called charge-conveyor or carrier electrodes (likewise consisting of metallic segments in the conventional machine).

Each of the permeability-selective membranes 8–14 and 28–34 is now electrically conductive since it has one of its surfaces contacted by conductive liquid, and hence constitutes an equipotential surface of the electric field. Preferably, the main and side portions of each membrane, including the rounded sections therebetween, are contoured to provide a uniform distribution of the flux lines of the electric field, as schematically indicated at 83.

Considering the instant in the operating cycle corresponding to the position shown in FIGURE 1, with the rotor 4 revolving in the direction indicated by arrow $f$ it will be seen that the charge carrier membranes 30 and 34 on the rotor are at O potential because of the engagement of the brush 78 with the commutator segments 74 and that these membranes are in the process of approaching a registering relation with the stator membranes 10 and 14. The membranes 10 and 14 comprise the inductors and are at a potential of $-U$. Consequently the mutual capacitance of the carriers 30 and 34 and the inductors 10 and 14 is increasing, and the carriers assume an increasingly positive charge by electrostatic induction. As the rotor 4 moves beyond the 45° position shown in FIGURE 1, the positive charge assumed by the carriers becomes a maximum. At this time the brush 78 disengages the segment 74 so that both carriers become insulated from ground. They therefore retain the acquired charge, and since the mutual capacitance of the carriers and inductors now starts to diminish, the potential of both carriers rises. As the rotor moves past a position 90° beyond the position shown, the carriers 30 and 34 attain the potential $+U$. At this instant the brush 76 engages the segment 74, so that the electric charge present on the carriers is now tapped through the brush 76 and the conductor 84 and is transmitted by way of the conductor 60 to the generator output terminal 62.

It will be understood that the portion of the operating cycle just described in connection with the charge carriers 30 and 34 recurs twice at 180° intervals per revolution of the rotor, and that an identical operating cycle involving the other two charge carriers 28 and 32 likewise recurs twice per rotor revolution in interspersed relation with the cycles of the carriers 30 and 34. There is thus collected at the generator output terminals 62 a practically continuous electrical current with a power output that is greatly higher than that of exciter E.

Figure 3:
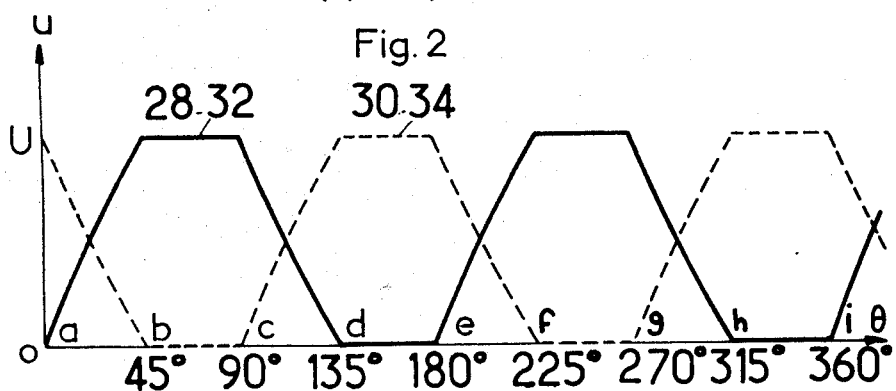
FIGURE 3 is an explanatory graph showing the relationship between voltage and the angular position of the rotor in the generator of FIGURE 1.

The above described operation will be more clearly understood by reference to the chart of FIGURE 3, which represents one full machine cycle, i.e., one rotor revolution. Potential fluctuations of the inductors are disregarded for clarity. The abscissae indicate the values of the rotor angular coordinates from 0 to 360°. The origin of the angular coordinates is selected as the instant at which the connector electrode 52 of the rotor is in registry with the stator electrode 50, that is, an angular position 45° ahead of the position shown in FIGURE 1. The full-line curve represents the potential variations of either one of the two charge carrying rotor membranes 28 and 32. The dash-line curve similarly refers to the other pair of rotor membranes 30 and 34. The switching operation performed by the commutator assembly proceeds in a cyclic manner that will become clear from a consideration of the following table:

| Angular coordinate of rotor | Switching action | |
|---|---|---|
| | 8-32 cycle | 30-34 cycle |
| 0° (point a) | Ground cutoff | Output cutoff. |
| 45° (point b) | Output contact | Ground contact. |
| 90° (point c) | Output cutoff | Ground cutoff. |
| 135° (point d) | Ground contact | Output contact. |
| 180° (point e) | Ground cutoff | Output cutoff. |
| 225° (point f) | Output contact | Ground contact. |
| 270° (point g) | Output cutoff | Ground cutoff. |
| 315° (point h) | Ground contact | Output contact. |

In this table, it will be understood that "Ground Cutoff" and "Ground Contact" designate the instants at which the grounded brush 78 disengages and engages a commutator segment, respectively, while "Output cutoff" and "Output contact" designate the respective instants at which the output brush 76 disengages and engages a commutator segment.

When considering any stationary point in the annular space 6 adjacent either one of the stator membranes 10 and 14, which are at the excitation potential $-U$ (in this embodiment equal and opposite to the output potential), such point is constantly exposed to a centrifugally directed electric field having a field strength which varies throughout the cycle between an absolute value $E_0$ and $2E_0$. The membranes 10 and 14 are made from a permeability-selective material of the cathodic type, that is, a material which will be readily traversed by cations (positive ions) but will arrest anions. The rotor membranes 28–34, on the other hand, are made from an anodic permeability-selective material. With this arrangement, positively ionized contaminants are discharged by the action of the electric field through the membranes 10 and 14 into the stator chambers 18 and 22, and negative contaminant ions are discharged through the rotor membranes 28–34 into the rotor chambers 36–42.

The other two stator membranes 8 and 12 are exposed to a weaker average field than the membranes 10 and 14, and this latter field is directed inwardly toward the center of the machine. The membranes 8 and 12 are made from an anodic permeability-selective material in order to participate in the purifying action during those phases of the cycle where a centripetal electric field is present thereadjacent.

The cathodic and anodic permeability-selective membranes may be made from any of various suitable ion-exchange materials and are available from various sources on the current market, e.g., the ion-exchange membranes Type A100 and Type C100 manufactured by the American Machine & Foundry Corp., 261 Madison Ave., New York, N.Y.

FIGURE 2 illustrates an electrostatic generator in accordance with a modified embodiment of the invention in which there is provided an inner stator 2a and an outer rotor 4a. The generator of FIGURE 2 again is of the Toepler class, and parts which are the same as corresponding parts in FIGURE 1 are identified by the same reference character. Parts in FIGURE 2 which are generally similar to corresponding parts in FIGURE 1 but are of different configuration have been designated with the same reference character followed by the alphabetical suffix "a."

For purposes of clarity, the commutator assembly in FIGURE 2, including the four collector segments 68–74, has been shown separate from the rotor rather than concentric therewith, but it is to be understood that the commutator actually is concentric with the rotor and bodily rotatable therewith, as schematically indicated by the dashed connecting line. The construction and operation of the corresponding parts in the FIGURE 2 embodiment are in many respects the same as in the first embodiment and will not be described anew.

The embodiment of FIGURE 2 additionally includes four rotor insert elements 88 and four stator insert elements 90. The elements 88 are inserted in the intervals between the facing end portions of adjacent rotor membranes 28a, 30a, 32a and 34a, while the elements 90 are similarly inserted between the facing portions of adjacent stator membranes 8a, 10a, 12a and 14a. The configuration of the elements 88 and 90 is such that the facing rotor and stator surfaces are in the form of smooth, continuous cylinders, thereby providing substantially improved flow conditions for the liquid in the annular gap 6a. The inserts 88 and 90 are made from a suitable non-corrodable solid substance having a dielectric constant approximating that of the liquid in the gap 6a. With this arrangement, the electrical field pattern between the stator and the rotor is substantially the same as in the FIGURE 1 embodiment.

The modifications of the invention shown in FIGURES 4 and 5 comprise electrostatic generators in which only one of the two relatively rotatable parts of the generator, specifically the stator, is provided with permeability-selective membranes and liquid-containing chambers defined thereby. As in the FIGURE 2 modification, in FIGURES 4 and 5 the same reference character has been used to identify identical parts, and the same reference character followed by an alphabetical suffix has been used to identify parts which are related but are different in configuration.

FIGURE 4 is illustrative of a Toepler-type four-pole generator having an inner stator $2b$ and outer annular rotor $4b$ mounted coaxially with the stator and driven in rotation with respect thereto through suitable motor means (not shown). The stator $2b$ is generally cylindrical but is provided with four recesses $16b$, $18b$, $20b$ and $22b$. These recesses are cut out from the periphery of the stator to define four chambers uniformly spaced around the circumference, each recess being substantially less than 90° in arcuate extent. While the four recesses are shown as having flat bottom walls, the bottom walls may be arcuate if desired. The outer sides of the recesses are sealed by means of permeability-selective semipermeable membranes $8b$, $10b$, $12b$, and $14b$ which have their marginal edges overlapping the edges of the solid arcuate portions of the stator between the recesses. The membranes are sealingly secured to these stator portions, as with epoxy resin, and preferably are provided with a part-cylindrical shape to impart a substantially smooth cylindrical overall contour to the outer surface of the stator. The membranes $10b$ and $14b$ are made of cathodic ion-exchange material, that is, a material which is permeable to cations (positive ions), while the membranes $8b$ and $12b$ are made of an anodic ion-exchange material, permeable to anions.

Mounted in the chambers $16b$, $18b$, $20b$ and $22b$ are the respective connector electrodes 44, 46, 48 and 50. The opposed electrodes 44 and 48 are cross-connected by a conductor 60 and are connected to the output terminal 62 of the generator. This output terminal develops a voltage $+U$ which illustratively is of the order of 60 kv. The opposed electrodes 46 and 50 are interconnected by a conductor 64 and are connected to the negative terminal of the exciter source, the output potential $-V$ of which is 30 kv. The other terminal of the exciter source is grounded at O, as is one terminal of a load or receiver apparatus shown schematically at 7. The opposite terminal of the load is connected to the generator output terminal.

The annular rotor $4b$ comprises a cylindrical shell of insulating material having four conductive electrode members 128, 130, 132 and 134 secured to its outer surface, to provide charge-carriers. The carrier electrodes 128, 130, 132 and 134 are each in the form of a strip of conductive material which is of substantial length in a direction parallel to the generatrices of the rotor, normal to the plane of the drawing, and has a part-cylindrical shape with an arcuate extent of somewhat less than 90°. The side margins of each strip may be rounded and flanged radially outward to improve the uniformity of the electric field patterns. The strips are secured in any suitable manner to the outer shell of the rotor, e.g., with an epoxy resin.

The annular interstitial space $6b$ between the rotor $4b$ and the stator $2b$ is filled with a suitably polar liquid such as nitrobenzene. Each of the four stator chambers $16b$–$22b$ is likewise filled with a liquid which, desirably, is initially the same as the liquid introduced into the space $6b$. Pluggable orifices (not shown) may be provided for facilitating the filling operation.

Commutator means are associated with the rotor electrodes 128–132 and have not been shown in FIGURE 4 since they may be similar to the commutator means illustrated in FIGURES 1 and 2. Thus, the commutator assembly may include four collector segments extending over 45° arcs and rotatable bodily with the rotor $4b$. One pair of opposite segments is connected to a first pair of opposite carrier electrodes 128 and 132 and the other pair of segments is connected to the other pair of carrier electrodes 130 and 134. The segments may be engaged by two stationary brushes arranged in 90° displaced relationship and respectively connected to the generator output terminal 62 and ground, as in FIGURE 2. Other suitable commutating arrangements also may be used with good effect.

In the operation of the generator of FIGURE 4, it will be noted that adjacent the membranes $10b$ and $14b$, whose associated electrodes 46 and 50 are connected to the negative potential $-V$, there exists an inwardly-directed (centripetal) electric field. Adjacent the membranes $8b$ and $12b$ whose associated electrodes 44 and 48 are connected to the positive output potential $+U$, there exists an outward, centrifugal field. Any positive contaminant ions (cations) in the space $6b$ in a region adjacent either of the negative membranes $10b$ and $14b$ are driven inwardly along the lines of force of the centripetal field. Since the membranes $10b$ and $14b$ are cathodic, i.e., are traversable by positive ions, these ions are passed by the membranes into the chambers $18b$ and $22b$ and remain trapped in the chambers, thus increasing the ion concentration of the liquid therein.

At the same time, any negative contaminant ions (anions) present in the space $6b$ in a region adjacent either of the positive membranes $8b$ and $12b$ are driven inwardly along the lines of force of the centrifugal field (since negative charges travel counter to the sense of the field). As the membranes $8b$ and $12b$ are made anodic, i.e., traversable by negative ions, the negative ions are passed by the membranes into the chambers $16b$ and $20b$ where they remain trapped and increase the ion concentration of the liquid in these chambers.

With respect to positive contaminant ions in the space $6b$ that are situated adjacent the positive membranes $8b$ and $12b$, such positive ions are repelled by the membranes and are driven radially outward. Most of the repelled ions tend to settle momentarily on the inner surface of the rotor $4b$, although some of them possibly remain briefly suspended in the liquid in the space $6b$. Due to the rotation of the rotor (partly entraining with it the liquid in the space $6b$), the repelled ions are promptly brought to positions adjacent the negative membranes $10b$ and $14b$, where they are taken up by the lines of force of the centripetal fields and pass through the membranes into the chambers $18b$ and $22b$.

Negative contaminant ions adjacent the negative membranes $10b$ and $14b$ are handled in a generally similar manner is the positive ions adjacent the positive membranes $8a$ and $12a$, so as to be entrained with the rotation of the rotor and then enter and become trapped in the chambers $16b$ and $20b$.

The arrangement is such that the liquid in the annular space $6b$ becomes quickly depleted of contaminants of either sign and assumes a high resistivity, high purity, high dielectric condition shortly after the machine is first placed in operation. The liquid in the stator chambers $16b$–$22b$ concurrently becomes highly conductive. The condition of the liquid in the space $6b$ is permanently maintained throughout the operating life of the machine through a continuous purifying process of the type outlined above.

FIGURE 5 illustrates an electrostatic machine of the insulating-carrier type, rather than the conductive-carrier types disclosed in the preceding figures. The general construction of the machine is in some respects similar to that of the machine of FIGURE 4. However, the conductive charge carriers, such as the arcuate strips 128, 130, 132 and 134 in FIGURE 4, are here omitted, and there are instead provided four stationary ionizing electrodes 228, 230, 232 and 234. Each of these electrodes is in the form of an elongated conductive strip which extends parallel to the generatrices of the rotor $4c$ and has a sharp edge directed inwardly toward the outer rotor surface and spaced a short radial distance therefrom. One pair of opposite ionizing electrodes 228 and 232 is connected to the generator output terminal 62, and the other pair of electrodes 230 and 234 is connected to ground.

In the operation of the machine of FIGURE 5, as the rotor rotates, the ionizing electrodes 228–234, acting in cooperation with the inductor electrodes comprising the permeability-selective membranes 8c–14c, serve to deposit and withdraw charges on the periphery of the rotor 8c, which in this case comprises an insulated charge carrier or conveyor, replacing the conductive charge carriers or conveyors used in the machines shown in FIGURES 1, 2 and 4. A more detailed description of the operation of electrostatic generators of the insulated-conveyor type may be found, inter alia, in U.S. Patent 2,781,460, granted Feb. 12, 1957, to Noel Felici, and in U.S. Patent 2,785,320 granted Mar. 12, 1957, to Roger Morel. As the rotor begins its rotation, the chambers 16c–22c and the permeability-selective membranes 8c–14c operate in a manner similar to that of FIGURE 4 to bring the polar liquid in the annular space 6c to a state of very high purity, resistivity and dielectric properties, and the liquid is maintained in this condition throughout the operation of the machine.

It will be apparent from the foregoing that in certain particularly advantageous embodiments of the invention there is provided a rotary electrostatic machine utilizing a liquid rather than a gas as the dielectric medium between its relatively rotating parts. The substitution of a liquid for a gaseous medium many times increases the specific power rating of the machine in a ratio corresponding to the ratio of the dielectric constant of polar liquids (about 20 to 100) to the dielectric constant of a gas (unity). While the presence of a liquid between the stator and the rotor somewhat increases mechanical losses through friction, such losses do not exceed about 10% of the useful output, as an order of magnitude, and hence are small when compared to the gain in specific power.

Various modifications may be introduced into the exemplary machines disclosed herein without exceeding the scope of the invention. As an illustration, the relatively rotatable parts, instead of being in the form of coaxial cylindrical members, may be flat discs, e.g., a set of stator discs and a set of rotor discs in interspersed relation as in the so-called "axial air-gap" machines. The liquid-filled chambers and associated permeability-selective membranes of such machines may be carried on flat side faces of selected discs, rather than on cylindrical surfaces as specifically illustrated herein. While the electrostatic machines to which the invention is applied are here shown as DC generators, it is evident that the invention also may be applied to electrostatic AC generators, for example. For such a purpose, referring by way of example to FIGURE 4, a pair of collector rings are mounted on the rotor shaft in respective engagement with suitable stationary brushes, and the rings are connected to the pair of carrier electrodes 128 and 132 and to the pair of carrier electrodes 130 and 134, respectively, such that the desired alternating output is generated across the brushes. Electrostatic machines according to the invention also may be used as motors rather than generators in accordance with standard principles of reversibility. In addition, the commutator means of FIGURES 1 and 2, where such means are required, may assume various forms other than that shown and illustratively may comprise electronic switching means. A great number of other modifications will be apparent to those skilled in the art.

As additional examples of suitable fluids which are usable as the dielectric medium in the interstitial space between the relatively rotatable members, and also in the ion-trapping chambers, nitrotoluene, nitromethane, ethyl alcohol, acetone and acetonitrile may be employed with good effect, but the listing is not exhaustive. Among the usable materials are substantially any polar organic liquid having a low natural ionization factor (and a correspondingly high resistivity when pure). The fluid in each of the ion-trapping chambers is not necessarily the same as the fluid in the annular space but may be any suitable acidic or basic solution, e.g., a solution of a suitable compound in a solvent which constitutes the fluid in the space.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. In rotary electrical apparatus, in combination, a pair of relatively rotatable members having spaced surfaces defining a separating space therebetween, means for establishing an electric field in said separating space, a dielectric fluid in said space, said fluid exhibiting high resistivity and dielectric characteristics when substantially pure but having comparatively lower resistivity and dielectric characteristics when containing contaminant ions, means defining a fluid-filled cavity in juxtaposition with said separating space, and an ion-permeable membrane sealing said cavity and having one surface thereof exposed to the fluid in the cavity and the other surface exposed to the fluid in said space, said electric field driving contaminant ions in the fluid in said space through said membrane into said cavity to maintain the fluid in said space in a state of high purity with high resistivity and dielectric characteristics.

2. In rotary electrical apparatus, in combination, a pair of relatively rotatable members having spaced surfaces defining a separating space therebetween, electrode means for establishing an electric field in said separating space, a dielectric fluid in said space, said fluid exhibiting high resistivity and dielectric characteristics when substantially pure but having comparatively lower resistivity and dielectric characteristics when containing contaminant ions, means carried by at least one of said relatively rotatable members and defining a plurality of fluid-filled cavities in juxtaposition with said separating space, and a plurality of semipermeable membranes respectively sealing said cavities, each of said membranes having one surface thereof exposed to the fluid in the corresponding cavity and the other surface exposed to the fluid in said space, said electric field driving contaminant ions in the fluid in said space through said membranes into said cavities to maintain the fluid in said space in a state of high purity with high resistivity and dielectric characteristics.

3. Apparatus according to claim 2, in which one of said membranes is permeable to cations and another of said membranes is permeable to anions.

4. Apparatus according to claim 2, in which the cavity-defining means forms a fluid-filled cavity on each of said relatively rotatable members.

5. In rotary electrical apparatus, in combination, a pair of relatively rotatable members having spaced surfaces defining a separating space therebetween, electrode means for establishing an electric field in said separating space, a polar liquid in said space, said liquid exhibiting high resistivity and dielectric characteristics when substantially pure but having comparatively lower resistivity and dielectric characteristics when containing contaminant ions, means defininig a liquid-filled cavity in juxtaposition with said separating space, and a semi-permeable membrane sealing said cavity and having one surface thereof exposed to the liquid in the cavity and the other surface exposed to the liquid in said space, said electric field driving contaminant ions in the liquid in said space through said membrane into said cavity to maintain the liquid in said space in a state of high purity with high resistivity and dielectric characterstics.

6. Apparatus according to claim 5, wherein said electrode means comprises an electrode positioned within said cavity in contact with the liquid therein, said electrode being supplied with a potential of predetermined polarity, said membrane being permeable to ions of a polarity opposite from said predetermined polarity.

7. Apparatus according to claim 5, wherein the cavity-defining means forms a first cavity and a second cavity, a semi-permeable membrane permeable to cations sealing the first cavity and a semi-permeable membrane permeable to anions sealing the second cavity.

8. In rotary electrical apparatus, in combination, a pair of relatively rotatable members in coaxial relationship with each other, said members having spaced cylindrical surfaces defining a separating space between the members, electrode means for establishing an electric field in said separating space, a polar liquid in said space, said liquid exhibiting high resistivity and dielectric characteristics when substantially pure but having comparatively lower resistivity and dielectric characteristics when containing contaminant ions, means defining a liquid-filled cavity in juxtaposition with said separating space, and an ion-permeable membrane having one surface thereof exposed to the liquid in the cavity and the other surface exposed to the liquid in said space, said membrane including a main body portion in the form of a cylindrical segment coaxial with said members and an edge portion sealingly secured to one of said surfaces, said electric field driving contaminant ions in the liquid in said space through said membrane into said cavity to maintain the liquid in said space in a state of high purity with high resistivity and dielectric characteristics.

9. Apparatus according to claim 8, wherein the edge portion of said membrane is contoured to provide a substantially uniform electric field pattern across said space.

10. In rotary electrical apparatus, in combination, a pair of relatively rotatable members in coaxial relationship with each other, said members having spaced cylindrical surfaces defining a separating space between th members, electrode means for establishing an electric field in said separating space, a polar liquid in said space, said liquid exhibiting high resistivity and dielectric characterstics when substantally pure but having comparatively lower resistivity and dielectric characteristics when containing contaminant ions, means carried by one of said relatively rotatable members and defining a plurality of spaced-apart liquid-filled cavities therein in juxtaposition with said separating space, and a plurality of semi-permeable membranes respectively sealing said cavities, each of said membranes having one surface thereof exposed to the liquid in said space, each said membrane including a maid body portion in the form of a cylindrical segment coaxial with said members and an edge portion sealingly secured to said one member, said electric field driving contaminant ions in the liquid in said space through said membranes into said cavities to maintain the liquid in said space in a state of high purity with high resistivity and dielectric characteristics.

11. Apparatus according to claim 10, including insert means carried by said one member in the space between said cavities, said insert means cooperating with the main body portions of said membranes to define a substantially continuous part-cylindrical surface therewith and being fabricated of a material having a dielectric constant approximating that of said polar liquid in its substantially pure condition.

12. Apparatus according to claim 10, in which the liquid inserted in said cavities has the same properties as the liquid inserted in said separating space.

13. In an electrostatic generator, in combination, a rotor member and a stator member in coaxial relationship with each other, said members having spaced cylindrical surfaces defining a separating space therebetween, electric charge-carrier means associated with one of said members, means cooperating with said charge-carrier means for establishing an electrostatic field in said separating space, a polar liquid in said space, said liquid exhibiting high resistivity and dielectric characteristics when substantially pure but having comparatively lower resistivity and dielectric characteristics when containing contaminant ions, means carried by at least one of said members and defining a liquid-filled cavity in juxtaposition with said separating space, and a semi-permeable membrane sealing said cavity and having one surface exposed to the liquid in said space, said electrostatic field driving contaminant ions in the liquid in said space through said membrane into said cavity to maintain the liquid in said space in a state of high purity with high resistivity and dielectric characteristics.

14. In an electrostatic generator according to claim 13, said electric charge-carrier means being carried by said rotor member, and the means cooperating with said charge-carrier means comprising an electrode disposed within said cavity.

15. An electric rotating machine comprising, in combination, a pair of relatively rotatable members having spaced coaxial surfaces defining a separating space therebetween, a dielectric polar liquid in said space, said liquid exhibiting high resistive and dielectric characteristics when substantially pure but having comparatively lower resistivity and dielectric characteristics when containing contaminant ions, electric charge-carrier means associated with one of said members, means carried by a first of said members and defining a plurality of cavities having open sides facing said space, a plurality of semi-permeable membranes respectively sealing the open sides of said cavities and having surfaces exposed to the dielectric liquid in said space, a conductive liquid filling said cavities and contacting the opposite surfaces of said membranes, means including an electrode in each cavity in contact with the conductive liquid therein, a high-voltage terminal connected to one of said electrodes and another terminal at a substantially different voltage from that of the high-voltage terminal connected to another of said electrodes, said electrodes cooperating with said charge-carrier means to create electric fields across said space adjacent the respective membranes, the field adjacent one membrane being directed toward said one membrane and the field adjacent another membrane being directed away from said another membrane during at least a substantial portion of the rotational cycle of the machine, said fields directing contaminant ions of positive and negative polarity in said dielectric liquid through the membranes into the respective cavities to maintain the dielectric liquid in a state of high purity with high resistivity and dielectric characteristics.

16. A machine according to claim 15, including a plurality of said cavities and a plurality of said membranes on each of said relatively rotatable members, the membranes on one of said members comprising said charge-carrier means.

17. A machine according to claim 15, wherein said charge-carrier means is carried by a second of said relatively rotatable members.

18. A machine according to claim 17, wherein said first member comprises a stator and said second member comprises a rotor.

19. A machine according to claim 17, wherein said charge-carrier means comprises a highly resistive surface on said second member, and ionizing means associated with said second member for depositing and withdrawing electric charges on and from said highly resistive surface.

20. A machine according to claim 17, wherein said charge-carrier means comprises a pair of conductive electrodes carried by said second member.

References Cited

UNITED STATES PATENTS

| | | | |
|---|---|---|---|
| 2,644,900 | 7/1953 | Hardway | 310—2 |
| 2,781,460 | 2/1957 | Felici | 310—6 |

FOREIGN PATENTS

| | | |
|---|---|---|
| 1,123,033 | 5/1955 | Germany. |

MILTON O. HIRSHFIELD, *Primary Examiner.*

D. F. DUGGAN, *Assistant Examiner.*